(12) United States Patent
Foster

(10) Patent No.: US 12,215,600 B2
(45) Date of Patent: Feb. 4, 2025

(54) COMPOSITE FAN BLADE WITH LEADING EDGE SHEATH AND ENERGY ABSORBING INSERT

(71) Applicant: RTX Corporation, Farmington, CT (US)

(72) Inventor: Larry Foster, South Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 156 days.

(21) Appl. No.: 15/803,594

(22) Filed: Nov. 3, 2017

(65) Prior Publication Data

US 2019/0136697 A1     May 9, 2019

(51) Int. Cl.
*F01D 5/14*     (2006.01)
*F01D 9/02*     (2006.01)
*F01D 25/00*    (2006.01)

(52) U.S. Cl.
CPC .............. *F01D 5/147* (2013.01); *F01D 9/02* (2013.01); *F01D 25/005* (2013.01); *F05D 2220/32* (2013.01); *F05D 2220/36* (2013.01); *F05D 2230/23* (2013.01); *F05D 2230/60* (2013.01); *F05D 2240/303* (2013.01); *F05D 2300/603* (2013.01)

(58) Field of Classification Search
CPC .......... F01D 5/147; F01D 9/02; F01D 25/005; F05D 2220/32; F05D 2230/23; F05D 2230/60
USPC ......................................................... 416/224
See application file for complete search history.

(56) References Cited

U.S. PATENT DOCUMENTS

| | | | | |
|---|---|---|---|---|
| 5,384,959 | A | * | 1/1995 | Velicki ................. B21D 26/055 29/889.71 |
| 7,780,420 | B1 | | 8/2010 | Matheny |
| 2005/0008492 | A1 | * | 1/2005 | Whitehead .............. F01D 5/147 416/229 R |
| 2013/0199934 | A1 | * | 8/2013 | Parkos, Jr. ................ C25D 1/02 205/50 |
| 2017/0130585 | A1 | * | 5/2017 | Kray ........................ F01D 5/147 |
| 2017/0175540 | A1 | * | 6/2017 | Weber ..................... F01D 5/147 |
| 2018/0010614 | A1 | * | 1/2018 | Sellinger ................. F01D 5/282 |

FOREIGN PATENT DOCUMENTS

EP     3045661 A1     7/2016
EP     3168142 A1 *   5/2017   ........... F04D 29/324

OTHER PUBLICATIONS

European Search Report from the European Patent Office for EP Application No. 18204095.6 dated Mar. 25, 2019, 7 pages.

* cited by examiner

*Primary Examiner* — Sabbir Hasan
(74) *Attorney, Agent, or Firm* — CANTOR COLBURN LLP

(57) ABSTRACT

An airfoil for a gas turbine engine includes a blade body, a leading edge sheath, and an energy absorbing insert. The blade body has a pressure side and a suction side that each between a forward portion and a trailing edge. The leading edge sheath has a leading edge portion that is spaced apart from the forward portion, a first arm that engages the pressure side, and a second arm that engages the suction side. A cavity is defined between the leading edge portion, the first arm, the second arm, and the forward portion. The energy absorbing insert is disposed within the cavity and improves the impact resistance of the airfoil.

10 Claims, 6 Drawing Sheets

COMPOSITE FAN BLADE WITH LEADING EDGE SHEATH AND ENERGY ABSORBING INSERT

BACKGROUND

Exemplary embodiments pertain to the art of gas turbine airfoils.

Gas turbine engines may have a fan module or compressor module that includes blades. The blades of the fan module may contribute approximately 25% to 30% of an overall weight of the gas turbine engine. The blades of the fan module may also be subject to FAA bird strike requirements. The blades may have an increased thickness proximate the leading edge to improve impact resistance of the blade but the increased thickness leads to an increase in the overall weight of the blade as well as a decrease in the aerodynamic efficiency, both of which may adversely affect fuel burn. Accordingly, it is desirable to provide blades of lighter weight with greater impact energy absorption capability during a blade impact event.

BRIEF DESCRIPTION

Disclosed is an airfoil for a gas turbine engine that includes a blade body, a leading edge sheath, and an energy absorbing insert. The blade body has a pressure side and a suction side that each extend radially between a root and a tip and each extend axially between a forward portion and a trailing edge. The leading edge sheath has a leading edge portion that is spaced apart from the forward portion, a first arm that extends from the leading edge portion towards the trailing edge and engages the pressure side, and a second arm that extends from the leading edge portion towards the trailing edge and engages the suction side. A cavity is defined between the leading edge portion, the first arm, the second arm, and the forward portion. The energy absorbing insert is disposed within the cavity.

In addition to one or more of the features described herein, the first arm has a first arm thickness, the second arm has a second arm thickness, and the leading edge portion has a leading edge thickness.

In addition to one or more of the features described herein, at least one of the first arm thickness and the second arm thickness progressively decrease in a direction that extends from the leading edge portion towards the trailing edge.

In addition to one or more of the features described herein, the blade body is made of a composite material.

In addition to one or more of the features described herein, the energy absorbing insert engages the leading edge portion, the first arm, the second arm, and the forward portion.

In addition to one or more of the features described herein, the energy absorbing insert is made of at least one of a non-Newtonian material, D3O, polyborodimethylsiloxane, viscoelastic urethane polymers, nanogel, aerogel, norborene, and polynorbornene.

Also disclosed is a method of manufacturing an airfoil. The method includes forming a blade body having a pressure side and a suction side each extending between a forward portion and a trailing edge; providing a leading edge sheath having a leading edge portion, a first arm extending from the leading edge portion, and a second arm extending from the leading edge portion; positioning the leading edge sheath relative to the blade body such that the leading edge portion is spaced apart from the forward portion; and joining the first arm to the pressure side and second arm to the suction side, such that a cavity is defined between the between the leading edge portion, the first arm, the second arm, and the forward portion.

In addition to one or more of the features described herein, the method includes inserting an energy absorbing insert into the cavity.

In addition to one or more of the features described herein, the method includes inserting a plug at least partially into the cavity to retain the energy absorbing insert within the cavity.

In addition to one or more of the features described herein, the method includes inserting a bladder within the cavity; and inserting an energy absorbing insert into the bladder.

In addition to one or more of the features described herein, the method includes sealing the bladder.

In addition to one or more of the features described herein, the method includes inserting a plug at least partially into the cavity to retain the energy absorbing insert within the cavity.

Further disclosed is a method of manufacturing an airfoil. The method includes forming a blade body having a pressure side and a suction side each extending radially between a root and a tip and each extending between a forward portion and a trailing edge; and bonding an energy absorbing insert to the forward portion that extends between the root and the tip.

In addition to one or more of the features described herein, the energy absorbing insert is made of at least one of a non-Newtonian material, D3O, polyborodimethylsiloxane, viscoelastic urethane polymers, nanogel, aerogel, norborene, and polynorbornene.

In addition to one or more of the features described herein, the method includes providing a leading edge sheath having a leading edge portion, a first arm extending from the leading edge portion, and a second arm extending from the leading edge portion.

In addition to one or more of the features described herein, the method includes joining the first arm to the pressure side and second arm to the suction side, such that the leading edge portion is spaced apart from the forward portion.

In addition to one or more of the features described herein, the energy absorbing insert engages the leading edge portion, the first arm, and the second arm.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and methods are presented herein by way of exemplification and not limitation with reference to the Figures.

Figure 1:
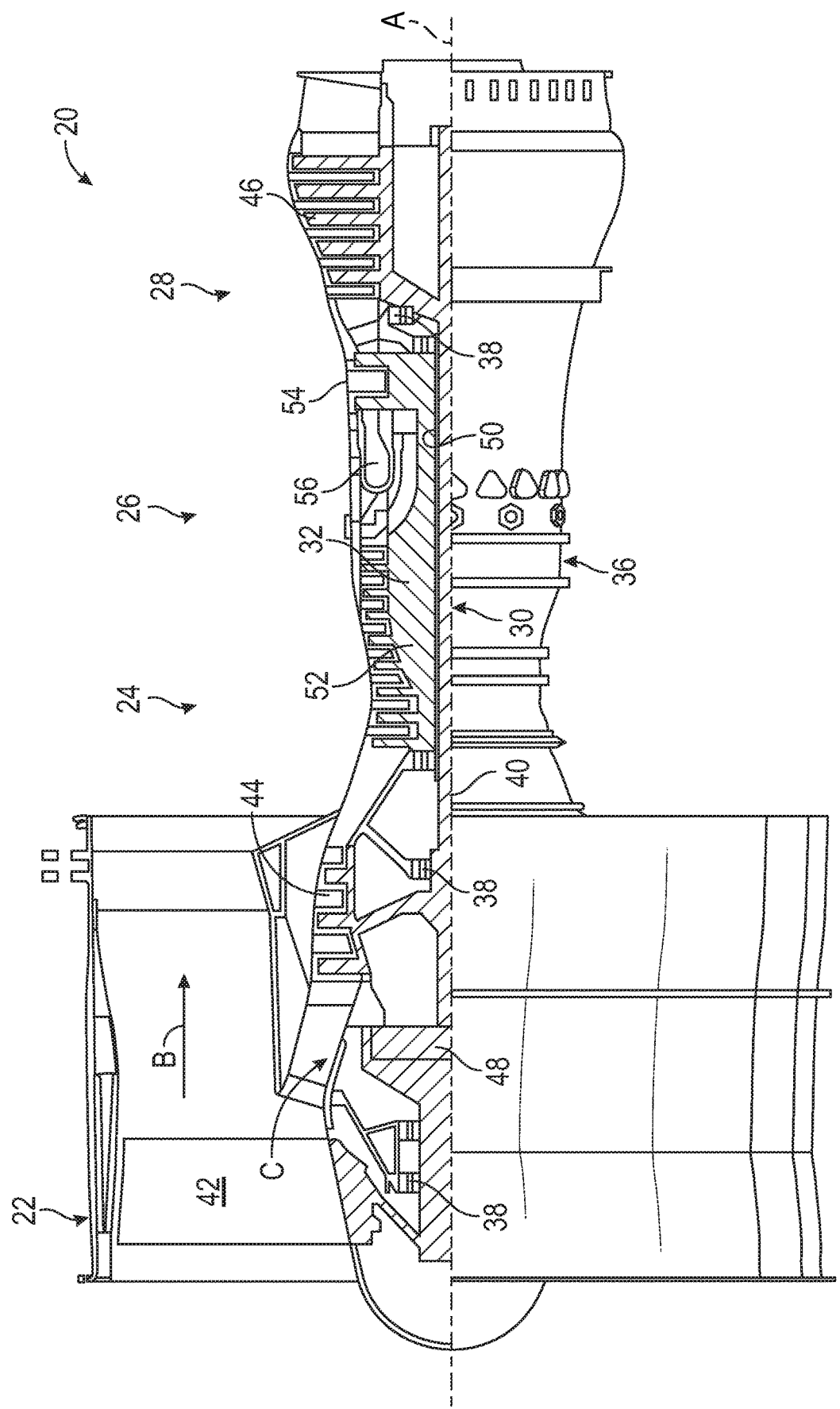
FIG. 1 is a schematic representation of a gas turbine engine.

FIG. 1 schematically illustrates a gas turbine engine 20 that may be a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,°R)/(518.7°R)]^{0.5}$. The "Low corrected fan tip speed" as disclosed herein according to one non-limiting embodiment is less than about 1150 ft/second (350.5 m/sec).

Figure 2:
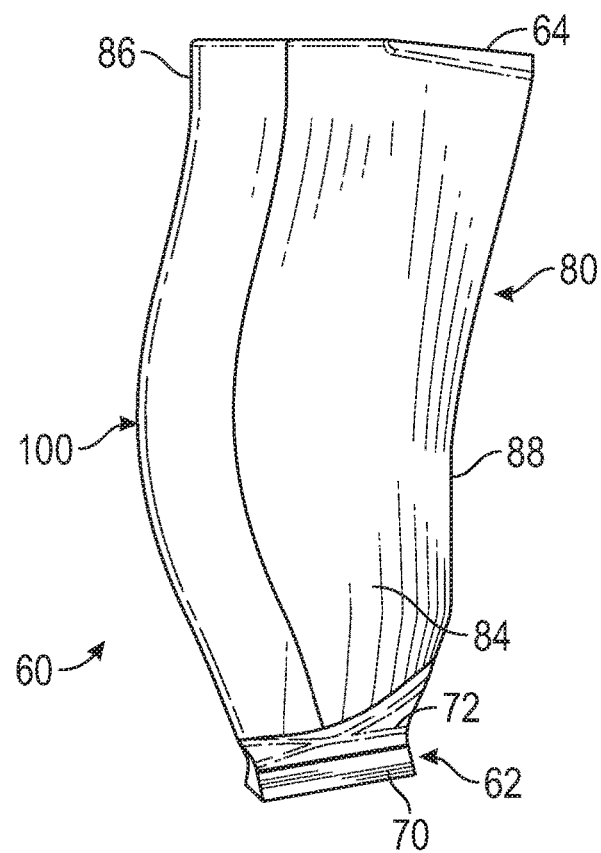
FIG. 2 is a perspective view of an airfoil of the gas turbine engine.

Referring to FIG. 2, the fan section 22 and/or the compressor section 24 may be provided with an airfoil 60 that may be provided as part of a blade, a stator, or vane. The airfoil 60 may be a lightweight composite airfoil that radially extends (relative to the engine central longitudinal axis A) between a root 62 and a tip 64.

The root 62 may be configured as a dovetail root, a tree root, or the like that operatively connects the airfoil 60 to a hub, disk, or platform. The root 62 may include a base portion 70 and a neck portion 72 that radially extends from the base portion 70. The neck portion 72 may have a cross-sectional thickness or cross-sectional form that is less than a cross sectional thickness or cross-sectional form of the base portion 70. The neck portion 72 provides a smooth transition between the base portion 70 and a blade body 80 that radially extends between the root 62 and the tip 64.

The blade body 80 may include or may define a pressure side 82 and a suction side 84. The tip 64 circumferentially extends (relative to the engine central longitudinal axis A) or tangentially extends between the pressure side 82 and the suction side 84. The pressure side 82 and the suction side 84 each extend radially between the root 62 and the tip 64. The pressure side 82 and the suction side 84 each extend axially (relative to the engine central longitudinal axis A) between a forward portion 86 and the trailing edge 88.

The blade body 80 may be a composite blade body that is made of a composite material. The composite material is a material system comprising of two or more phases (or materials) on a macroscopic scale whose mechanical properties are designed to be superior to those of the constituent materials acting independently. The blade body 80 may be composed of a composite material consisting of continuous fiber reinforcement and a polymeric matrix material.

Figure 3:
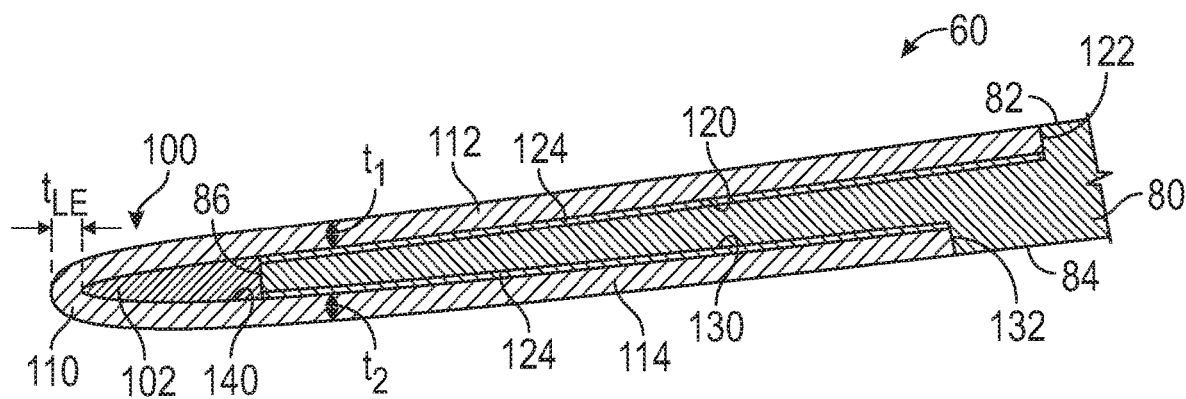
FIG. 3 is a partial cross-sectional view of the airfoil according to a first embodiment.

Referring to FIGS. 2-4, a leading edge sheath 100 may be provided to protect portions of the blade body 80 of the airfoil 60 and an energy absorbing insert 102 may be disposed between the leading edge sheath 100 and the blade body 80 to improve the impact resistance of the airfoil 60. The leading edge sheath 100 may be made by an additive manufacturing process such as an electroforming process. The leading edge sheath 100 may be made of a ceramic material, titanium, nickel, steel, or other metal alloys.

The leading edge sheath 100 radially extends between the root 62 and the tip 64. The leading edge sheath 100 axially extends towards the trailing edge 88. The leading edge sheath 100 includes a leading edge portion 110, a first arm 112, and a second arm 114.

Referring to FIGS. 3 and 4, the leading edge portion 110 may be axially spaced apart from the forward portion 86 of the blade body 80. The leading edge portion 110 may define an overall leading edge of the airfoil 60. The leading edge portion 110 may have a leading edge portion thickness, $t_{LE}$.

The first arm 112 axially extends from the leading edge portion 110 towards the trailing edge 88. The first arm 112 engages the pressure side 82. The first arm 112 may have a first arm thickness, $t_1$.

The second arm 114 axially extends from the leading edge portion 110 towards the trailing edge 88. The second arm 114 engages the suction side 84. The second arm 114 may have a second arm thickness, $t_2$.

A bonding agent or an adhesive 124 may be used to bond the first arm 112 to the pressure side 82 and the bonding agent or the adhesive 124 may be used to bond the second arm 114 to the suction side 84.

Referring to FIG. 3, the pressure side 82 may define a first recessed region 120 that extends from the forward portion 86 of the blade body 80 towards the trailing edge 88 and terminates at a first stop wall 122. The first arm 112 may be received within the first recessed region 120 and a distal end of the first arm 112 may abut the first stop wall 122. In such a configuration, an exterior surface of the first arm 112 may be disposed substantially flush with an exterior surface of the pressure side 84. Furthermore, the leading edge portion thickness, $t_{LE}$, the first arm thickness, $t_1$, and the second arm thickness, $t_2$ may be substantially equal to each other.

The suction side 84 may define a second recessed region 130 that extends from the forward portion of the blade body 80 towards the trailing edge 88 and terminates at a second stop wall 132. The second arm 114 may be received within the second recessed region 130 and a distal end of the second arm 114 may abut the second stop wall 132. In such a configuration, and an exterior surface of the second arm 114 may be disposed substantially flush with an exterior surface of the suction side 84.

Figure 4A:
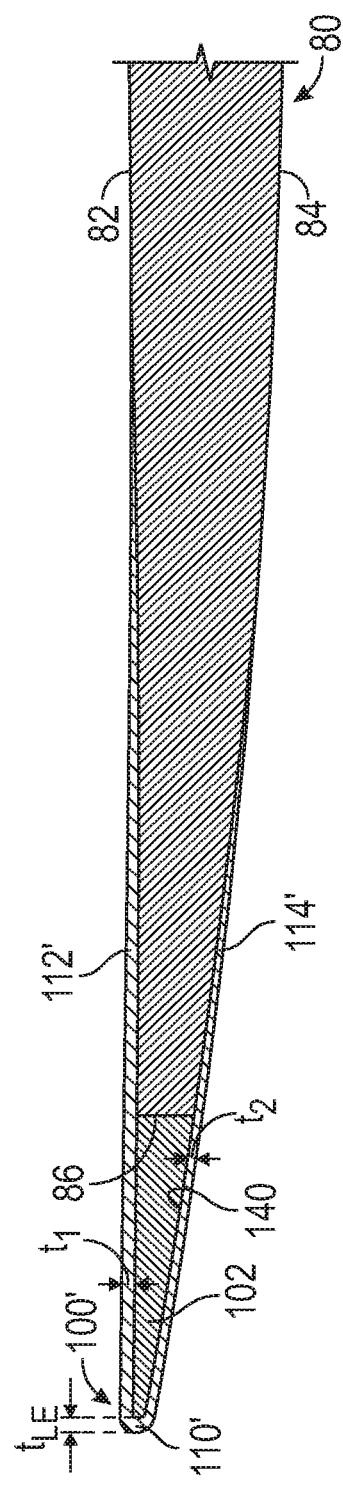
FIG. 4A is a partial cross-sectional view of the airfoil according to a second embodiment.

Referring to FIG. 4A, the first arm 112' may be disposed substantially flush with the pressure side 82 and the second arm 114' may be disposed substantially flush with the suction side 84. The first arm thickness, $t_1$, and the second arm thickness, $t_2$ may progressively decrease in a direction that extends from the leading edge portion 110' towards the trailing edge 88. The first arm 112' may terminate on the pressure side 82 farther aft than the second arm 114' may terminate on the suction side 84, such that a total chordwise length of the first arm 112' is greater than a total chordwise length of the second arm 114'.

Figure 4B:
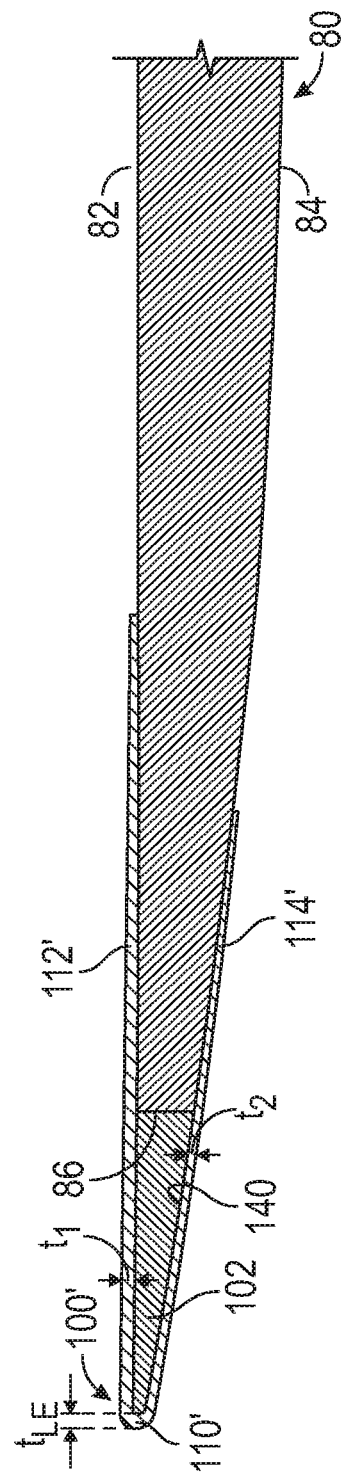
FIG. 4B is a partial cross-sectional view of the airfoil according to a third embodiment.

Referring to FIG. 4B, the leading edge sheath 100' may be disposed proud with respect to the surfaces of the blade body 80. In the proud configuration, the first arm 112' may extend above the pressure side 82 such that the first arm 112' is not flush with the pressure side 82 and the second arm 114' may extend above the suction side 84 such that the second arm 114' is not flush with the suction side 84.

The leading edge thickness, $t_{LE}$, may be greater than the first arm thickness, $t_1$, and the second arm thickness, $t_2$. In at least one embodiment, the first arm thickness, $t_1$, may be different than the second arm thickness, $t_2$. The first arm thickness, $t_1$, may be greater than the second arm thickness, $t_2$. The second arm thickness, $t_2$, may be greater than the first arm thickness, $t_1$.

The spacing apart of the leading edge portion 110 from the forward portion of the blade body 80 may define a cavity 140 between the forward portion 86 and interior surfaces of the leading edge portion 110, the first arm 112, and the second arm 114. The cavity 140 is sized such that a minimum thickness of the composite blade body 80 is maintained to avoid structural issues. The energy absorbing insert 102 may be disposed within the cavity 140 and may engage the forward portion 86 and interior surfaces of the leading edge portion 110, the first arm 112, and the second arm 114. In at least one embodiment, a bladder may be disposed within the cavity 140 and the energy absorbing insert 102 may be disposed within the bladder.

The energy absorbing insert 102 may be made of a material high impact energy absorbing characteristics such as: a non-Newtonian material that exhibits greater impact resistance at higher strain rates; D3O, polyborodimethylsiloxane, viscoelastic urethane polymers, Sorbothane, aerosorb, viscoelastic materials that exhibit time-dependent strain, nanogels, hydrogels, aerogel, norborene, polynorbornene, or lattice or other lightweight structures made from gels, possibly using additive manufacturing methods.

A plug may extend into the cavity 140 to retain the energy absorbing insert 102 within the cavity 140.

Figure 5:
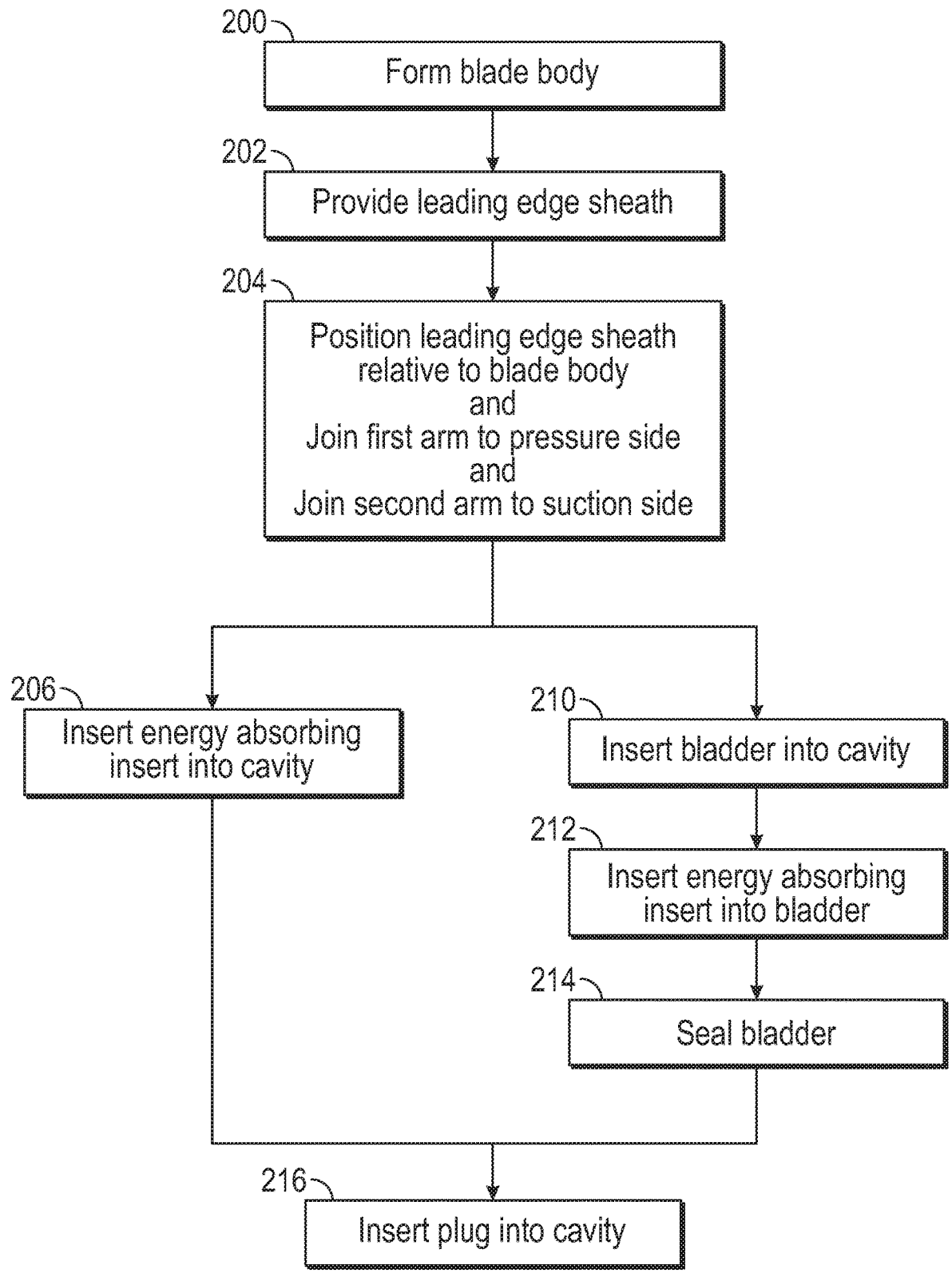
FIG. 5 is an illustrative method of manufacturing an airfoil.

Referring to FIG. 5, a first illustrative method of manufacturing the airfoil 60 is shown. At block 200, the blade body 80 may be formed. At block 202, the leading edge sheath 100 may be provided. At block 204, the leading edge sheath 100 may be positioned relative to the blade body 80 and the first arm 112 may joined to the pressure side 82 and the second arm 114 may be joined to the suction side 84.

At block 206, the energy absorbing insert 102 may be inserted or injected into the cavity 140 that is defined between the forward portion 86 and the leading edge portion 110, the first arm 112, and the second arm 114. Alternatively, at block 210, a bladder may be inserted within the cavity 140 and at block 212, the energy absorbing insert 102 may be inserted into the bladder. At block 214, the bladder may be sealed. Regardless of whether the energy absorbing insert 102 is directly injected into the cavity 140 or is injected into a bladder that is inserted into the cavity 140, at block 216 the plug may be inserted at least partially into the cavity 140 to retain energy absorbing insert 102 within the cavity 140. The plug may then be joined to the leading edge sheath 100 and the blade body 80. In at least one embodiment, a first plug may be inserted into the cavity 140 proximate the tip 64 and a second plug may be inserted into the cavity 140 proximate the root 62 or the base portion 70 to aid in retaining the energy absorbing insert 102 within the cavity 140.

Figure 6:
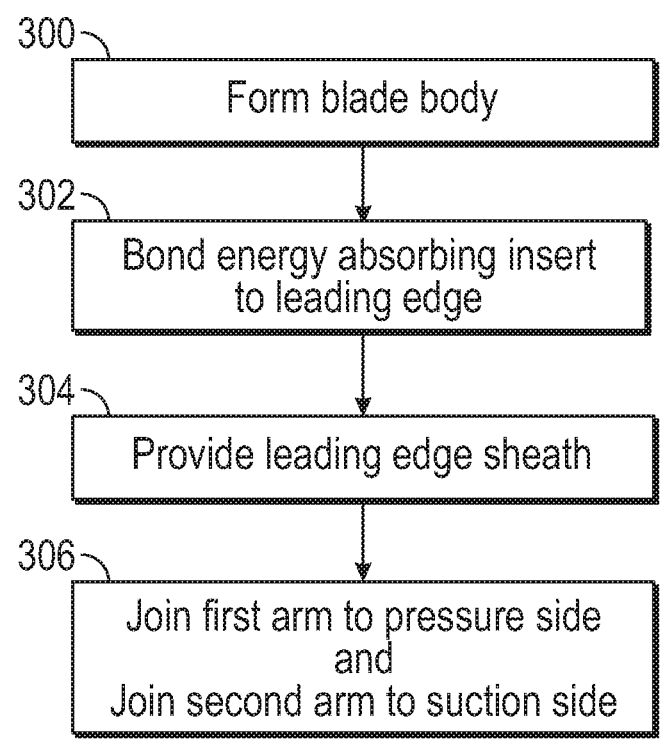
FIG. 6 is an illustrative method of manufacturing an airfoil.

Referring to FIG. 6, a second illustrative method of manufacturing the airfoil 60 is shown. At block 300, the blade body 80 may be formed. At block 302, the energy absorbing insert 102 may be bonded to the forward portion 86 of the blade body 80. The energy absorbing insert 102 may be bonded to the forward portion 86 using the adhesive 124. The energy absorbing insert 102 may radially extend between the root 62 and the tip 64 and may extend axially away from the forward portion 86. At block 304, the leading edge sheath 100 may be provided. At block 306, the first arm 112 of the leading edge sheath 100 may be joined to the pressure side 82 and the second arm 114 of the leading edge sheath 100 may be joined to the suction side 84. In at least one embodiment, the leading edge sheath 100 and the energy absorbing insert 102 may be joined to the blade body 80 all in one step.

The leading edge sheath 100 or 100' that is bonded to the composite blade body 80 along with the energy absorbing insert 102 enhances the impact resistance of the airfoil 60. Furthermore, the thickness of the blade body 80 and/or the airfoil 60 may be reduced and a thickness of the leading edge sheath 100 or 100' may be reduced, reducing overall weight of the airfoil 60 and improve the aerodynamic efficiency of the airfoil 60.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, comprising:
    a blade body having a forward face, a pressure side and a suction side, each of the pressure side and the suction side extending between a forward portion and a trailing edge;
    a leading edge sheath having a leading edge portion that is spaced apart from the forward portion, a first arm that engages the pressure side, and a second arm that engages the suction side, a cavity being defined between the leading edge portion, the first arm, the second arm, and the forward portion; and
    an energy absorbing insert including an insert face, the energy absorbing insert being disposed within the cavity, the energy absorbing insert being made of a non-Newtonian material, wherein the energy absorbing insert is arranged with the blade body such that the insert face extends completely across a width of the forward face, the width extending from the pressure side and the suction side.

2. The airfoil of claim 1, wherein the first arm has a first arm thickness, the second arm has a second arm thickness, and the leading edge portion has a leading edge thickness.

3. The airfoil of claim 2, wherein at least one of the first arm thickness and the second arm thickness progressively decrease in a direction that extends from the leading edge portion towards the trailing edge.

4. The airfoil of claim 1, wherein the blade body is made of a composite material.

5. The airfoil of claim 1, wherein the energy absorbing insert engages the leading edge portion, the first arm, the second arm, and the forward portion.

6. A method of manufacturing an airfoil, comprising:
    forming a blade body having a forward face, a pressure side, and a suction side, each of the pressure side and the suction side extending between a forward portion and a trailing edge;
    providing a leading edge sheath having a leading edge portion, a first arm extending from the leading edge portion, and a second arm extending from the leading edge portion;
    positioning the leading edge sheath relative to the blade body such that the leading edge portion is spaced apart from the forward portion;
    joining the first arm to the pressure side and the second arm to the suction side, such that a cavity is defined between the leading edge portion, the first arm, the second arm, and the forward portion; and
    inserting an energy absorbing insert into the cavity, the energy absorbing insert being made of a non-Newtonian material, wherein the energy absorbing insert has an insert face and the energy absorbing insert is arranged with the blade body such that the insert face extends completely across a width of the forward face, the width extending from the pressure side and the suction side.

7. A method of manufacturing an airfoil, comprising:
    forming a blade body having a pressure side and a suction side each extending radially between a root and a tip and each extending between a forward portion and a trailing edge, the forward portion defining a forward face; and
    bonding an energy absorbing insert to the forward face of the forward portion that extends between the root and the tip, the energy absorbing insert being made of a non-Newtonian material, wherein the energy absorbing insert has an insert face and the energy absorbing insert is arranged with the blade body such that the insert face extends completely across a width of the forward face, the width extending from the pressure side and the suction side.

8. The method of claim 7, further comprising:
    providing a leading edge sheath having a leading edge portion, a first arm extending from the leading edge portion, and a second arm extending from the leading edge portion.

9. The method of claim 8, further comprising:
    joining the first arm to the pressure side and the second arm to the suction side, such that the leading edge portion is spaced apart from the forward portion.

10. The method of claim 9, wherein the energy absorbing insert engages the leading edge portion, the first arm, and the second arm.

* * * * *